United States Patent [19]

Smith

[11] Patent Number: 5,339,623
[45] Date of Patent: Aug. 23, 1994

[54] SINGLY FUELED MULTIPLE THRUSTERS SIMULTANEOUSLY ENERGIZED BY A COMMON POWER SUPPLY

[75] Inventor: Peter Smith, Clanfield, United Kingdom

[73] Assignee: Matra Marconi Space UK Limited, Middlesex, United Kingdom

[21] Appl. No.: 993,769

[22] Filed: Dec. 22, 1992

[30] Foreign Application Priority Data

Dec. 27, 1991 [GB] United Kingdom ............ 9127433.2

[51] Int. Cl.$^5$ .............................................. F02K 1/00
[52] U.S. Cl. ........................................ 60/203.1; 60/229
[58] Field of Search ...................... 60/202, 203.1, 225, 60/229, 240, 243

[56] References Cited

U.S. PATENT DOCUMENTS

| | | | |
|---|---|---|---|
| 3,465,522 | 9/1969 | Anderson et al. | 60/202 |
| 3,520,137 | 7/1970 | Newman | 60/221 |
| 3,591,967 | 7/1971 | Paine . | |
| 4,397,147 | 8/1983 | Turchi | 60/202 |
| 4,805,400 | 2/1989 | Knowles . | |
| 4,862,032 | 8/1989 | Kaufman et al. | 60/202 |
| 4,869,929 | 9/1989 | Knowles et al. | 60/203.1 |

FOREIGN PATENT DOCUMENTS

| | | |
|---|---|---|
| 0426110 | 5/1991 | European Pat. Off. . |
| 1366930 | 6/1964 | France . |
| 2226999 | 7/1990 | United Kingdom . |

OTHER PUBLICATIONS

JBIS Journal of the British Interplanetary Society, vol. 43, No. 10, Oct. 1990, "Ion Propulsion Research And Development In The UK", Fearn et al., pp. 431–442.

Patent Abstracts of Japan, vol. 10, No. 372, Dec. 11th, 1986–Japanese Patent No. 61 164 083 (Abstract Only).

Primary Examiner—Richard A. Bertsch
Assistant Examiner—Timothy S. Thorpe
Attorney, Agent, or Firm—Spencer, Frank & Schneider

[57] ABSTRACT

A spacecraft has, in addition to redundant thrusters T3, T4 prime thrusters T1 or T2 arranged to be operated one at a time which are supplied with propellant 1 via valves V1 and V2. The thrusters are of the kind in which energy is transferred to the propellant by employing electrodes which create a current flow path through the propellant gas. A single power supply PSU1 provides power to several electrically-powered thrusters. It is connected such that when actuated all the thrusters to which it is connected become charged. However, only the thruster which receives propellant is able to carry current as the propellant forms part of the current carrying circuit, and this thruster therefore draws power. This technique allows the use of a single power supply for several thrusters while eliminating or minimizing the necessity to switch power from one thruster to another.

10 Claims, 2 Drawing Sheets

SINGLY FUELED MULTIPLE THRUSTERS SIMULTANEOUSLY ENERGIZED BY A COMMON POWER SUPPLY

BACKGROUND OF THE INVENTION

1. FIELD OF THE INVENTION

This invention relates to propulsion systems for spacecraft.

2. DESCRIPTION OF THE RELATED ART

The invention is particularly applicable to the type of propulsion system that produces a relatively low thrust in relation to its weight, making it unsuitable for lift-off of a spacecraft, i.e. the type of propulsion system that is suitable for making adjustments to the position and/or attitude of an orbiting spacecraft, and/or for varying the orbit. For this purpose, advantage can be taken of propulsion systems of relatively high specific impulse (a quantity which gives a measure of the impulse which can be produced from a given mass of propellant) which produce a low absolute value of thrust. Included among such propulsion systems are a kind which use electrical power to increase the specific impulse of the propellant by transferring energy into the propellant. Typical of such thrusters are ion engines, arc-Jets and plasma engines. In ion thrusters, the ions are accelerated out of the thruster by electrostatic attraction between aligned grids at appropriate potentials. In arc-jets the exhaust velocity is increased by heating the propellant by generating an arc through it. In plasma engines, including magneto-plasma thrusters and stationary plasma thrusters, the ionised propellant is accelerated by means of a strong magnetic field.

One example of adjustments which must be made to the position of an orbiting spacecraft concerns geostationary satellites, i.e. satellites in orbit around the equator at a radius of approximately 22,300 miles from the earth (FIG. 1). Because the plane of the orbit S is inclined to the plane of the ecliptic E, i.e. the earth's orbit around the sun (the earth's axis being inclined to the plane of its orbit), the orbit tends to be perturbed by the gravitation attraction of the sun, moon and planets, and it is found necessary to apply periodic east-west and, more frequently, north-south corrections to the spacecraft to maintain it in the necessary fixed solid angle as seen from the earth. For such so-called north-south station-keeping, it is conventional to provide a pair of thrusters, both on the north face, or both on the south face, or one on the north face and one on the south face of the spacecraft. In one arrangement where the thrusters do not act through the centre of gravity of the spacecraft, both thrusters must be fired simultaneously in order to avoid generating a moment about the centre of gravity of the spacecraft which would cause it to spin. In another arrangement where the thrusters do act through the centre of gravity of the spacecraft (FIG. 3), no spin can take place, but the thrusters are operated at spaced points in the orbit of the spacecraft to cancel an unwanted east-west component imparted to the spacecraft. It will be seen from FIG. 1 that a north-south correction must be imparted in the direction of the arrows. The north-south direction is also shown on the spacecraft shown in FIG. 2. The thrusters T generate thrust passing through the centre of gravity CG of the spacecraft. In applying a burst to one of the thrusters, a north component is generated, but a radial component is also generated. Build-up of the latter component can be offset by operating the south pointing thruster T at the opposite point in the orbit of the spacecraft.

In all cases, each thruster incorporates its own power supply for transferring electrical energy into the propellant by using propellant gas or vapour as part of the current carrying circuit.

SUMMARY OF THE INVENTION

The invention provides a propulsion system for a spacecraft comprising two or more thrusters of the kind in which transfer of energy into the propellant requires the creation of a current flow path through the propellant between electrodes, one power supply capable of energizing the electrodes of the thrusters simultaneously, and switch means arranged so that only one thruster at a time is supplied with propellant and can thus draw current through the propellant to enable thrust to be generated.

Current cannot be drawn through the propellant of the thruster which is not supplied with propellant, and hence it is not necessary to switch the electrodes of that thruster between which the current flows in addition to stopping the flow of propellant, which electrodes may be at high voltages and thus risk breakdown of switching contacts if switched. This then makes it feasible to power both or all the thrusters with a single power supply providing a significant weight reduction of the spacecraft. The thrusters are of course arranged in a configuration permitting sequential operation.

The switch means may be arranged to operate valve means in the propellant supply lines to the thrusters.

BRIEF DESCRIPTION OF THE DRAWINGS

A propulsion system for a spacecraft constructed in accordance with the invention will now be described by way of example with reference to the accompanying drawings, in which.

DETAILED DESCRIPTION OF THE PREFERRED EMBODIMENT

Figure 1:
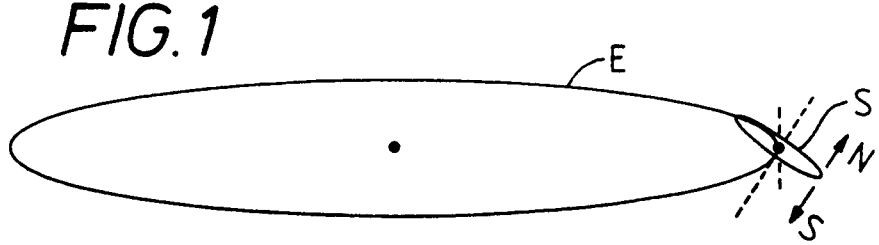
FIG. 1 is a schematic drawing, not to scale, of the orbit of the spacecraft.
Figure 2:
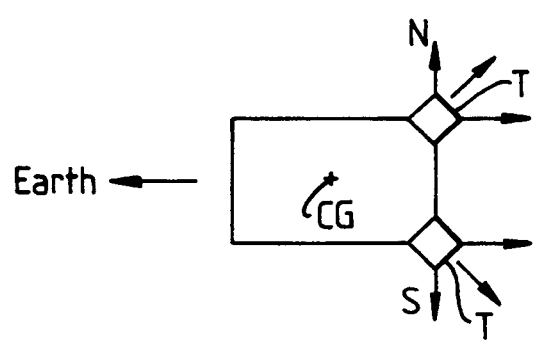
FIG. 2 is a schematic drawing of the spacecraft showing the general arrangement of the thrusters.
Figure 3:
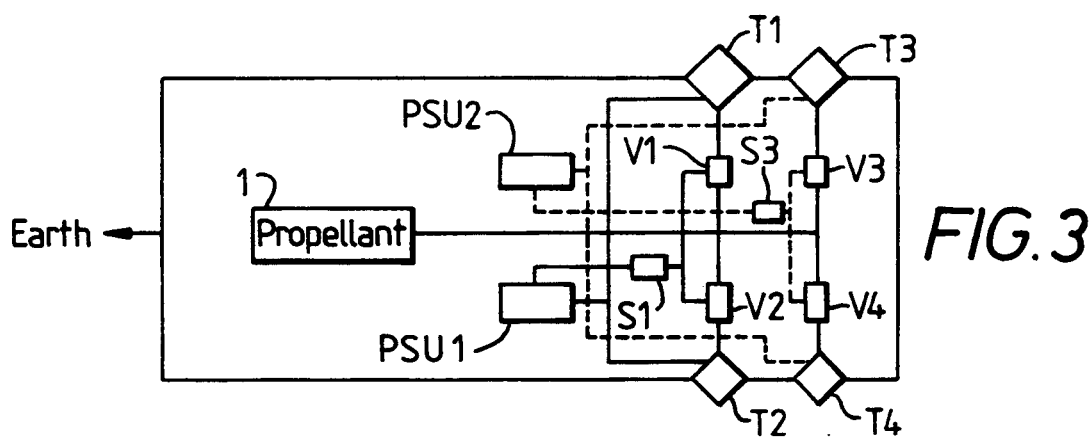
FIG. 3 shows one form of a spacecraft incorporating a propulsion system in accordance with the invention.

The spacecraft shown in FIG. 3 has thrusters T1, T2 arranged in the same way as for the spacecraft shown schematically in FIG. 2, i.e. the thrust acts through the centre of gravity of the spacecraft. It is standard practice in spacecraft to double-up on systems in order to minimise the risk of the spacecraft failing through failure at a single point and, to this end, redundant thrusters T3 and T4, also acting through the centre of gravity of the spacecraft are also provided. The latter thrusters do not come into operation unless one or both of the primary thrusters T1, T2 fails.

The thrusters T1 to T4 are supplied with propellant from a tank 1 of propellant via respective valves V1, V2, V3 and V4. Valves V1 and V2 are operated by a switch S1 controlled by a power supply unit Psu1, which also supplies the thrusters T1 and T2 in order to provide, inter alia, a supply to the electrodes of the thrusters. Redundant thrusters T3 and T4 are powered by redundant power supply unit 2, which also controls switch S3 for controlling the valves V3, V4 of the redundant thrusters. In operation, switching of switch S1 opens only valve V1 or V2 at any one time, in order to power respective thruster T1 or T2. The same applies for redundant thrusters T3 and T4 if they are brought into operation. A conventional spacecraft would have a dedicated power supply unit for each of the four thrusters, greatly increasing the weight of the spacecraft and reducing the weight of the payload.

The thrusters T1 to T4 may be ion thrusters, described in more detail with reference to FIG. 5, which relies on an exhaust of accelerated propellant ions to produce thrust, or it may be an arc-jet thruster, or other electrically-powered thruster which relies on a separate power supply unit. The arc-jet is described in more detail with reference to FIG. 4, in which case the propellant exhaust velocity is increased by heating of the propellant gas by means of an arc struck between two electrodes. (Unlike ion thrusters, in which more ionisation implies more thrust, ionisation in arc-jets, while necessary for the flow of current which causes the heating of the propellant, should be kept to a minimum because more ionisation requires more power which is a loss and does not produce a proportional increase in thrust). In all cases, the thrusters do not operate unless current flows through the propellant and, while it would be inconvenient to switch the electrodes on and off, since there are large potential differences between them and breakdown of the switching contacts could be caused, it is simply necessary to stop the flow of propellant to the relevant thruster because current is not drawn (except for negligible currents drawn through leakage paths) from the electrodes even when they are energised at their usual potential in the absence of propellant, because the current flows through the ionised propellant. Thus, the electrodes of all the thrusters are energised, i.e. charged, when one thruster is brought into operation. The thruster which draws electrical power and produces thrust is the one which receives propellant. It may, however, be found to be desirable to switch on and off supplies to purely resistive loads such as cathode heaters and electro-magnets. Since these would be low voltage supplies, the risk of contact breakdown is minimal in this case.

The propellant may be Xenon, Argon or Krypton, and may be stored in liquid form, or may be a solid such as Caesium or Mercury which is vapourised when heated.

Figure 4:
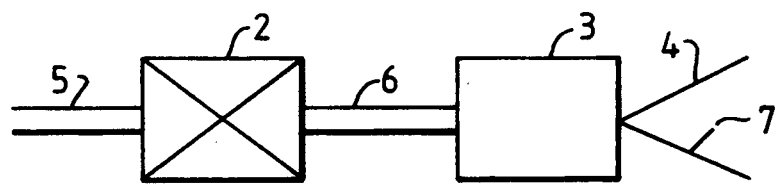
FIG. 4 shown in schematic drawing an arc-jet thruster.

FIG. 4 shows an arc-jet thruster suitable for use in the configuration of FIG. 3.

The arc-jet is supplied with hydrazine ($N_2H_4$) from pipe 5 into a valve 2 which supplies a catalyst bed 3 via an injector 6. The hydrazine dissociates on contact with the catalyst bed into ammonia, nitrogen and hydrogen, and the gases exhaust through the nozzle 4. To switch the arc-jet on and off, it is simply necessary to switch the valve 2 on and off, and it is not necessary to switch off the supply to the electrode 6, 7, since current cannot be drawn from these electrodes if there is no flow of gases between them. Alternative propellants to hydrazine could be used.

Figure 5:
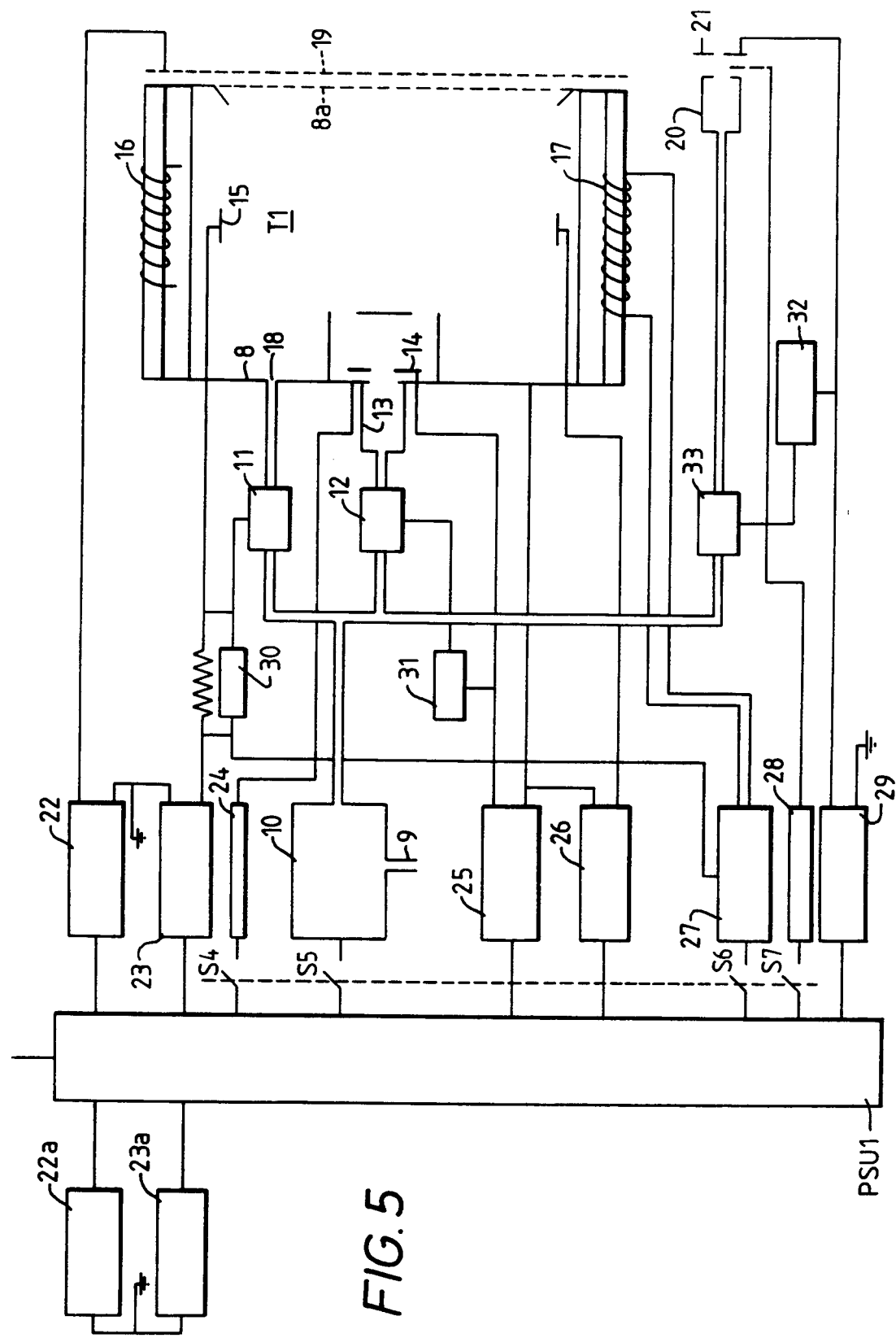
FIG. 5 shows in schematic form a circuit for powering the electrodes of two ion thrusters.

FIG. 5 shows in more detail the application of the arrangement shown in FIG. 3 to the case of ion thrusters. The general configuration of the ion thruster will not be described in detail because it is known and has, for example, previously been described in our British patent application No. 2,248,727.

Briefly, the ion thruster T1 comprises a discharge chamber 8 to which propellant is supplied from a pipe 9 via a valve 10 and via further valves 11, 12 and 33 to form respective main propellant flows, cathode propellant flows, and neutraliser propellant flows. The arc is initially struck in the ion thruster by providing a potential difference between hollow cathode 13 and cathode keeper 14 and electrons flow to annular anode 15 through a magnetic field generated by electro-magnets 16, 17 which cause the electrons to undergo a spiralling path and increase the probability of collision with main propellant flow through opening 18 to provide the main ion beam. The latter passes through the perforated end of the discharge chamber 8a and through a perforated accelerator grid 19 which is maintained highly negative relative to the discharge chamber to accelerate the ion beam and hence provide the thrust of the thruster. The accelerator grid 19 ensures that there is a low divergence to the ion beam, hence preventing electrons from being attracted with the thruster. The resulting positive ion beam emerging from the thruster is neutralised by the further propellant flow through valve 13 and hollow cathode 20. An arc is struck between hollow cathode 20 and cathode keeper 21 to generate an electron flow.

The power supply unit PSU1 feeds a number of subsidiary power supply units for the electrodes, as follows: the negative accelerator grid 22, the beam power supply unit 23, the cathode heater 24, the cathode keeper unit power supply unit 25, the anode power supply unit 26, the solenoid power supply unit 27, the neutraliser cathode heater 28 and the neutraliser keeper power supply unit 29.

All three propellant flows are controlled by control means 30–32 acting on control valves 11 to 12 and 13, respectively.

The power supply unit i also powers a thruster T2 provided with identical control circuitry to the left of power supply unit PSU1, but only the accelerator grid power supply unit 22a and beam power supply unit 23a have been shown.

When thruster T1 is operating and it is desired to stop it, it is simply necessary to open contact S5, which shuts valve 10, and thruster T1 then ceases to draw the heavy beam current because there is no electron flow to the annular anode 15 because there is no propellant in the thruster to be ionised. A small current would nevertheless be drawn from cathode heater power supply unit 24 neutraliser cathode heater power supply unit 28 and via electro-magnets 17 and 18 from their power supply unit 27 and, for this reason, further switches S4, S6 and S7 are provided to switch these power supplies off as well. Switches S4 to S7 are for convenience ganged together. It will be noticed that the accelerator grid power supply unit, beam power supply unit, anode power supply unit and cathode keeper power supply unit remain connected, because no current will be drawn from them. The same PSU1 also supplies power to thruster T2, but the heaters, the electro-magnets and the propellant valve 10a may be switched off via switches identical to the switches S4 to S7, and this thruster is brought into operation by closure of the switches. Power supply unit PSU1 could be supplied by the solar panels of the spacecraft or by an onboard battery charged by the solar panels. The various voltages provided within PSU1 are conveniently provided by a switched mode power converter.

Of course ion thrusters generally have dedicated power supplies and the single power supply for the two thrusters could provide non-ideal electrode potentials. The power supply therefore includes active control of the thruster by means of control loops corresponding to the three propellant flows described, magnet current adjustment and anode current adjustment. Thus, to get constant thrust, constant beam current from beam power supply unit 23 must be attained, and this is achieved by monitoring that current through a series resistor with control means 30 to vary the propellant flow by means of control valve 11 and/or magnet current by adjusting power supply unit 27. The voltage difference between the anode power supply unit 26 (constant current) and the cathode keeper power supply unit 25 (constant current) is held fixed by adjusting the cathode propellant flow via control means 31 and control valve 12, in order to ensure optimum propellant utilisation. The voltage difference between the neutraliser keeper 21 and the neutraliser cathode 20, caused by the neutraliser keeper power supply unit 29 in constant current mode, is held constant to maintain fixed neutraliser plasma conditions whilst minimising neutraliser dissipation, thus optimising neutraliser life by controlling the neutraliser cathode propellant flow rate via control means 32 and control valve 33. As an alternative to the use of active control loops, it would be possible to run two thrusters by setting up the power supply output to switch between two (or more) set points according to which thruster is in use.

Further thrusters, e.g. T5, T6 for east-west station keeping may also be supplied from power supply unit PSU1, it again being necessary that only one of the thrusters T1, T2, T5, T6 should be powered at any one time. If desired, however, switches S4, S6 and S7 could be omitted and connections to these power supply units made permanent, since the current drawn from these power supplies will only be small in practice.

As stated above, the invention is also applicable to an arrangement in which the ionised propellant is accelerated by means of a strong magnetic field, and active control of the thruster as described above may again be used, or alternatively set-point operation of more than one thruster is possible from one power supply.

I claim:

1. A propulsion system for a spacecraft, comprising:
   two or more thrusters, each thruster comprising a chamber, means for supplying gaseous propellant to the chamber, and electrodes arranged in the chamber so that, when the electrodes are energized, gaseous propellant is ionized to maintain a current flow path through the propellant between the electrodes thereby transferring energy into the propellant;
   one power supply for energizing the electrodes of each of the thrusters simultaneously, and
   switch means for supplying gaseous propellant to only one thruster thereby at a time for maintaining a current flow path through the propellant of the only one thruster thereby enabling thrust to be generated.

2. A propulsion system as claimed in claim 1, including valve means controlled by the switch means for opening and closing a supply of propellant gas to the thruster.

3. A propulsion system as claimed in claim 1, in which the thrusters are ion thrusters.

4. A propulsion system as claimed in claim 1, in which the thrusters are arc-jets.

5. A propulsion system as claimed in claim 1, in which the thrusters are plasma engines.

6. A propulsion system for a spacecraft, comprising:
   at least two thrusters, each thruster comprising a chamber, and electrodes arranged in the chamber for ionizing a gaseous propellant when the electrodes are energized to maintain a current flow path through the propellant between the electrodes for transferring energy into the propellant;
   one power supply for energizing the electrodes of each of the thrusters simultaneously, and
   switch means, coupled to each thrusters, for supplying gaseous propellant to only one thruster at a time for maintaining a current flow path through the propellant of the only one thruster thereby enabling thrust to be generated.

7. A propulsion system according to claim 6, further comprising valve means, controlled by the switch means, for controlling a supply of propellant to each thruster.

8. A propulsion system according to claim 6, wherein the thrusters are ion thrusters.

9. A propulsion system according to claim 6, wherein the thrusters are arc-jets.

10. A propulsion system according to claim 6, wherein the thrusters are plasma engines.

* * * * *